US010723057B2

(12) United States Patent
Song et al.

(10) Patent No.: US 10,723,057 B2
(45) Date of Patent: Jul. 28, 2020

(54) NOZZLE, NOZZLE ASSEMBLY AND METHOD FOR EXTRUSION OF COMPOSITE MATERIAL

(71) Applicant: The Boeing Company, Chicago, IL (US)

(72) Inventors: Weidong Song, Woodinville, WA (US); Jeffrey H. Olberg, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 793 days.

(21) Appl. No.: 15/189,316

(22) Filed: Jun. 22, 2016

(65) Prior Publication Data
US 2017/0368732 A1    Dec. 28, 2017

(51) Int. Cl.
*B29C 48/03*    (2019.01)
*B29C 67/00*    (2017.01)
(Continued)

(52) U.S. Cl.
CPC ............ *B29C 48/131* (2019.02); *B29C 48/02* (2019.02); *B29C 48/05* (2019.02); *B29C 48/152* (2019.02); *B29C 48/154* (2019.02); *B29C 48/30* (2019.02); *B29C 48/3001* (2019.02); *B29C 67/004* (2013.01); *B29C 70/745* (2013.01); *B29L 2031/003* (2013.01)

(58) Field of Classification Search
CPC .. B29C 47/12; B29C 47/0002; B29C 47/0035
USPC .................................................... 264/177.13
See application file for complete search history.

(56) References Cited

U.S. PATENT DOCUMENTS

| 7,476,097 B1* | 1/2009 | Mangelsen ............... B28B 3/24 222/390 |
| 2007/0031529 A1* | 2/2007 | Koch .................. B29C 47/0014 425/376.1 |

(Continued)

FOREIGN PATENT DOCUMENTS

EP    2905118    8/2015

OTHER PUBLICATIONS

Rathinavelu ("Design and Analysis of a Polymer Co-Extrusion Die Using the Finite Element Method," 1984). (Year: 1984).*
(Continued)

*Primary Examiner* — Matthew J Daniels
*Assistant Examiner* — Hana C Page
(74) *Attorney, Agent, or Firm* — Perman & Green LLP

(57) ABSTRACT

A nozzle for extruding a composite material from an extruder barrel. The nozzle includes a body and a tapered nozzle passage extending through the body. The tapered nozzle passage having a nozzle inlet opening configured to interface with the extruder barrel, and a nozzle outlet opening, where the tapered nozzle passage has a contoured nozzle passage surface extending between the extruder barrel and the nozzle outlet opening with smooth transitions, free of angles, so that each nozzle passage surface portion, having a corresponding contour, transitions smoothly to each other nozzle passage surface portion, having a respective different contour, from the nozzle inlet opening to the nozzle outlet opening, and the nozzle outlet opening is defined by at least a first edge and a second edge that intersect each other at an acute angle.

20 Claims, 12 Drawing Sheets

(51) Int. Cl.
    *B29C 70/74*     (2006.01)
    *B29C 48/02*     (2019.01)
    *B29C 48/05*     (2019.01)
    *B29C 48/154*     (2019.01)
    *B29C 48/30*     (2019.01)
    *B29C 48/152*     (2019.01)
    *B29L 31/00*     (2006.01)

(56) References Cited

U.S. PATENT DOCUMENTS

| | | | |
|---|---|---|---|
| 2008/0173293 A1 | 7/2008 | Baratta | |
| 2009/0028984 A1* | 1/2009 | Brelski | B29C 45/20 425/549 |
| 2014/0034236 A1* | 2/2014 | Guzman | B29C 70/526 156/324 |
| 2015/0224699 A1 | 8/2015 | Larsen et al. | |
| 2016/0082641 A1 | 3/2016 | Bogucki et al. | |
| 2018/0194054 A1* | 7/2018 | Hombert | B29B 7/805 |

OTHER PUBLICATIONS

European Search Report, European Application No. 17165295 dated Oct. 17, 2017.

\* cited by examiner

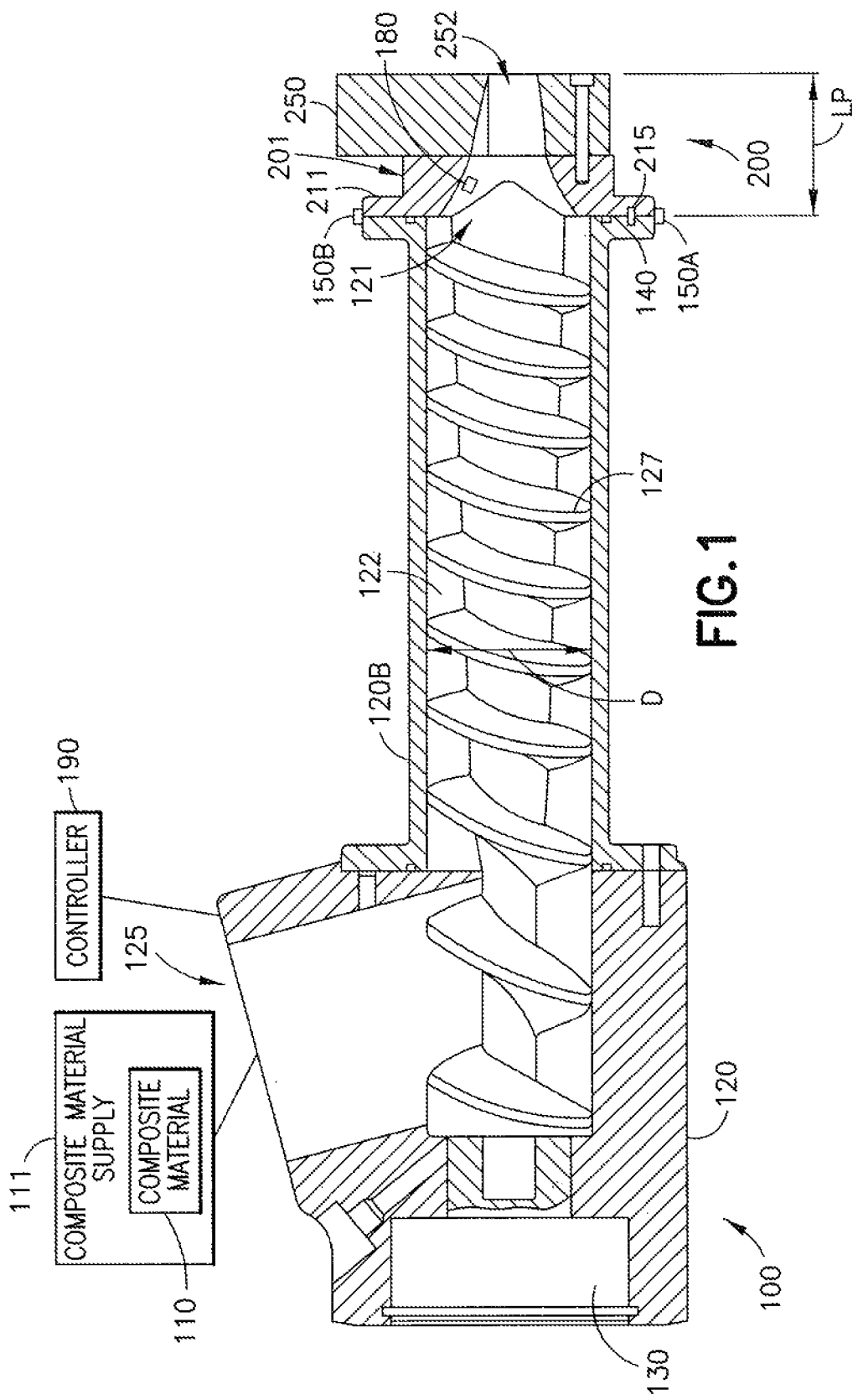

NOZZLE, NOZZLE ASSEMBLY AND METHOD FOR EXTRUSION OF COMPOSITE MATERIAL

BACKGROUND

Composite components such as airframes component, including but not limited to aircraft skins, spars, ribs, frames, longerons, stringers and stiffeners, can be fabricated from flat composite ply layups. The composite airframe components can be provided with complex cross-sectional shapes, such as, e.g., an "L", "U", "Onion", "hat", "I", "T", "J", "Z" or the like cross-sectional shapes, depending on, at least the type and amount of load the composite airframe component is designed to carry. The cross sectional shapes are configured to stiffen the composite airframe components where the composite airframe components are folded to form portions of the cross section but leave voids or cavities where the folds meet the other elements of the composite section. For example, the composite airframe components can be fabricated by abutting legs of two composite structural members so as to form groove or channel at their junction where the groove is then filled with a composite material. In one aspect, the composite material is placed within the groove of the composite airframe component where voids are left between the composite material and surface(s) of the two composite structural members. In other aspects, extrusion of a composite material causes the surface of the extruded composite material to tear or exhibit other poor surface and edge qualities. In still other aspects, a shape of the extruded composite material may change or twist after the composite material is extruded.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to a nozzle for extruding a composite material from an extruder barrel. The nozzle comprising a body and a tapered nozzle passage extending through the body. The tapered nozzle passage having a nozzle inlet opening configured to interface with the extruder barrel, and a nozzle outlet opening, where the tapered nozzle passage has a contoured nozzle passage surface extending between the extruder barrel and the nozzle outlet opening with smooth transitions, free of angles, so that each nozzle passage surface portion, having a corresponding contour, transitions smoothly to each other nozzle passage surface portion, having a respective different contour, from the nozzle inlet opening to the nozzle outlet opening, and the nozzle outlet opening is defined by at least a first edge and a second edge that intersect each other at an acute angle.

Another example of the subject matter according to the present disclosure relates to a nozzle assembly for extruding a composite material from an extruder barrel. The nozzle assembly comprising a nozzle comprising a body and a tapered nozzle passage extending through the body. The tapered nozzle passage having a nozzle inlet opening, and a nozzle outlet opening, where the tapered nozzle passage has a contoured nozzle passage surface extending between the extruder barrel and the outlet opening with smooth transitions, free of angles, so that each nozzle passage surface portion, having a corresponding contour, transitions smoothly to each other nozzle passage surface portion, having a respective different contour, from the nozzle inlet opening to the nozzle outlet opening, and the nozzle outlet opening is defined by at least a first edge and a second edge that intersect each other at an acute angle. The nozzle assembly further includes an adapter fitting comprising an adapter fitting inlet opening and an adapter fitting outlet opening, the adapter fitting inlet opening is configured to interface with the extruder barrel and the adapter fitting outlet opening is configured to interface with the nozzle inlet opening, the adapter fitting including a contoured adapter passage surface extending between the extruder barrel and the nozzle inlet opening.

Still another example of the subject matter according to the present disclosure relates to a method of extruding a composite material. The method comprising feeding the composite material through a tapered nozzle passage that extends through a body of a nozzle between an extruder barrel and an outlet opening of the nozzle, the composite material flowing over a contoured nozzle passage surface of the tapered nozzle passage where the contoured nozzle passage surface smoothly transitions, free of angles, so that each nozzle passage surface portion, having a corresponding contour, transitions smoothly to each other nozzle passage surface portion, having a respective different contour, from the extruder barrel to the outlet opening, and the outlet opening is defined by at least a first edge and a second edge that intersect each other at an acute angle. The method further includes extruding the composite material from the outlet opening.

BRIEF DESCRIPTION OF THE DRAWINGS

Figure 2A:
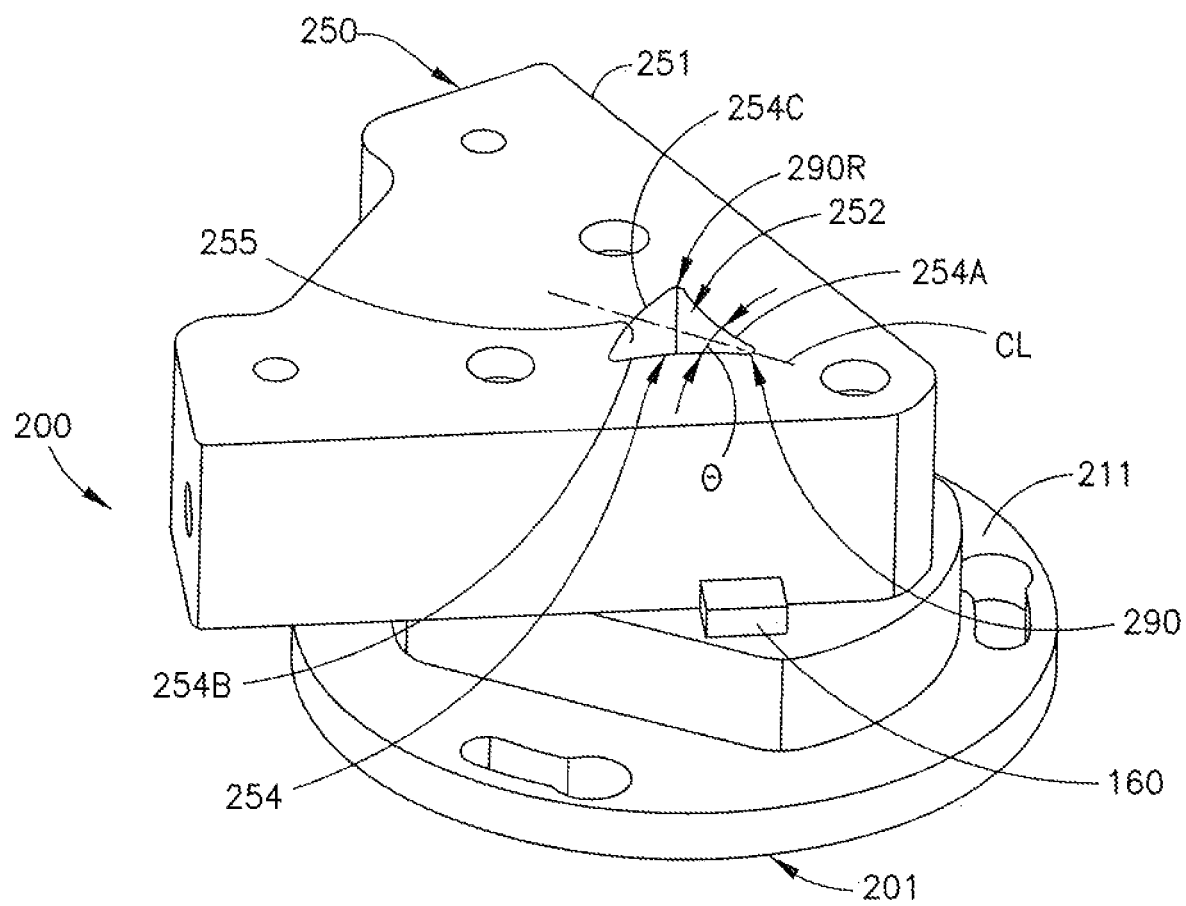
Figure 2B:
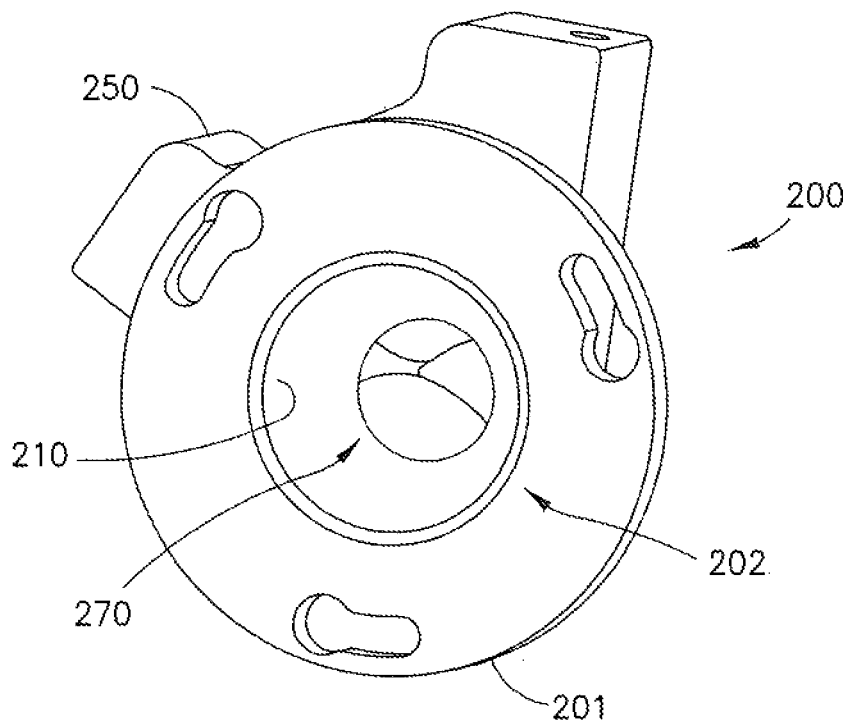
Figure 2C:
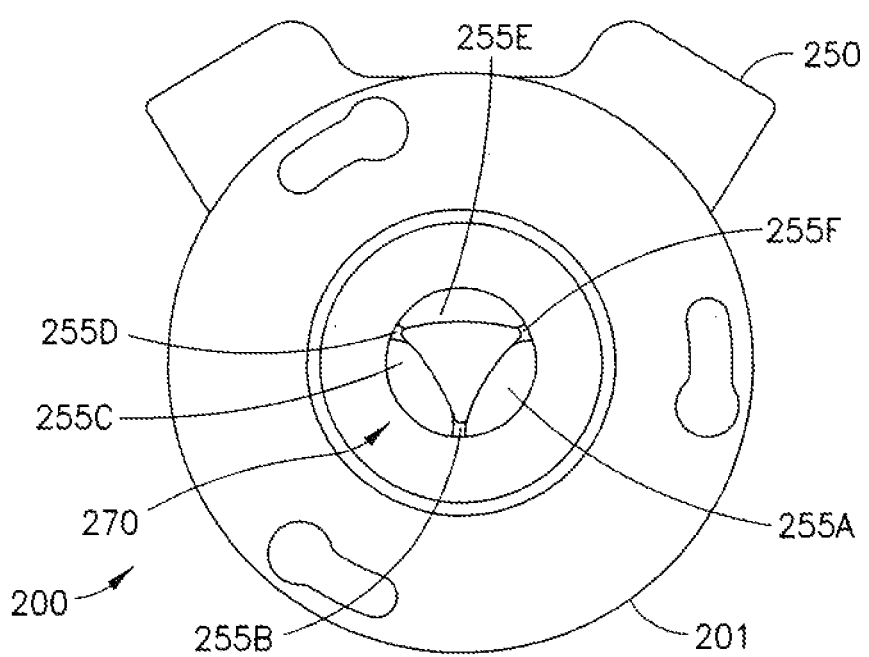
Figure 3A:
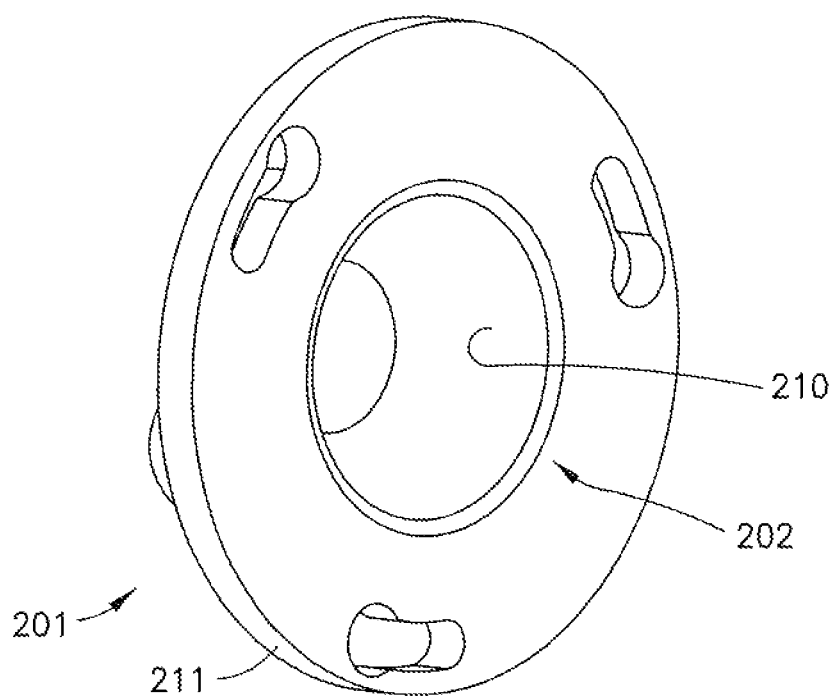
Figure 3B:
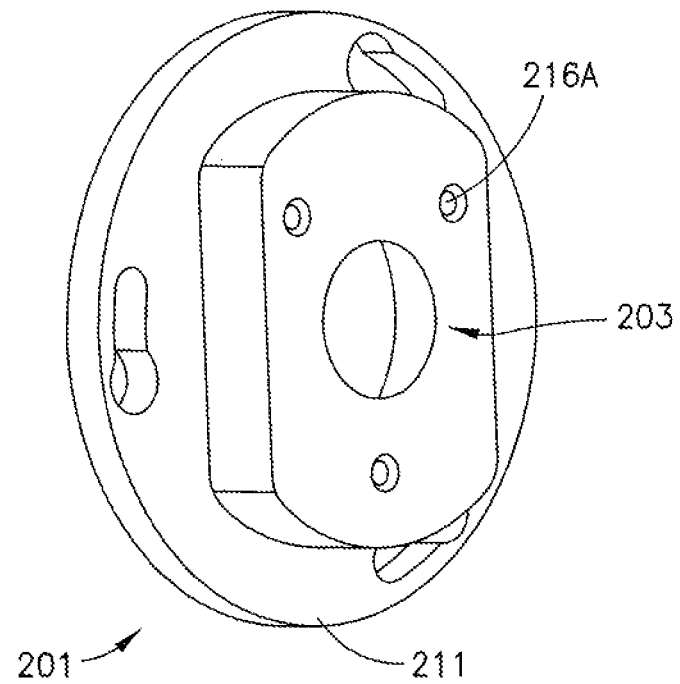
Figure 4A:
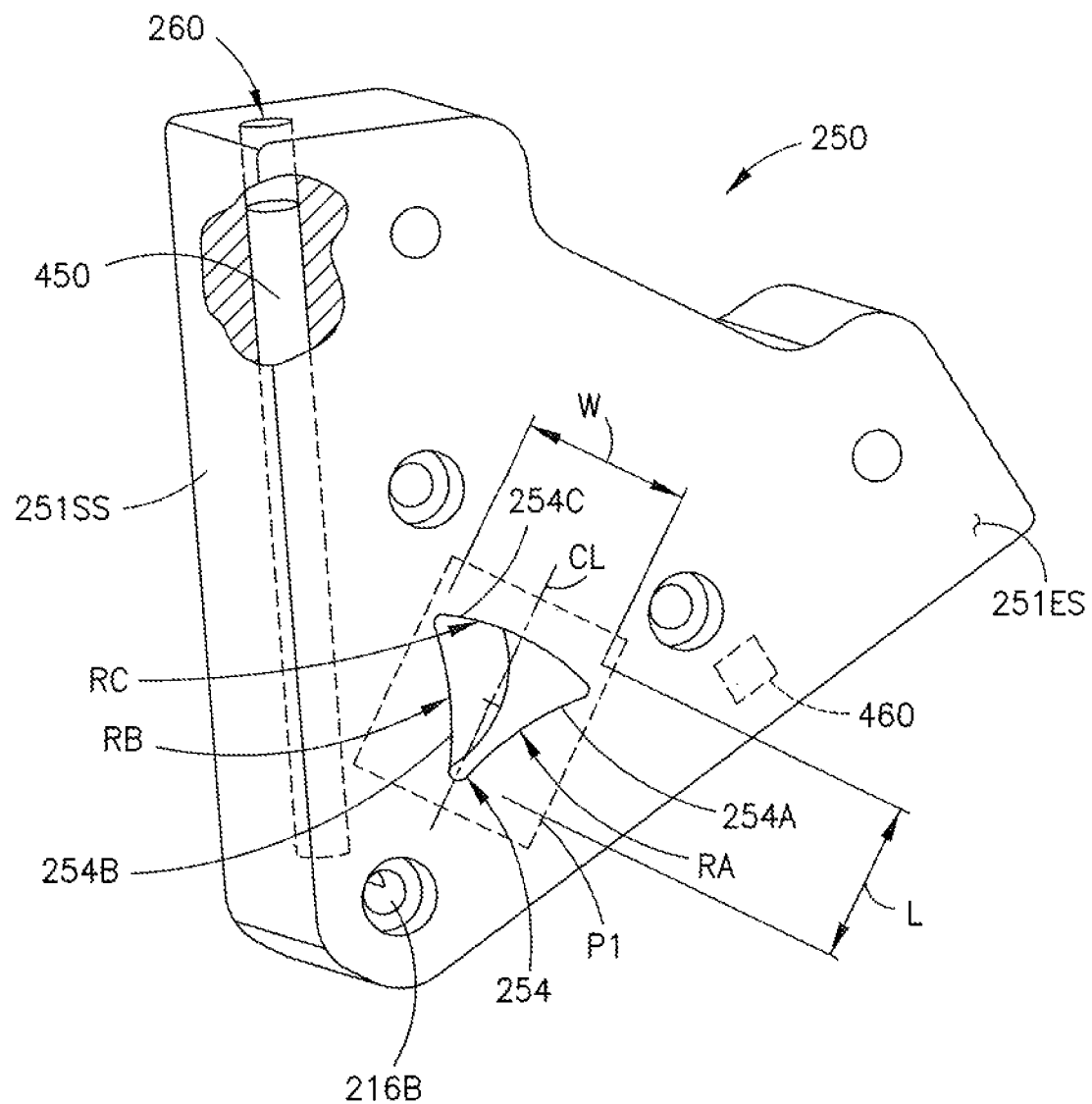
Figure 4B:
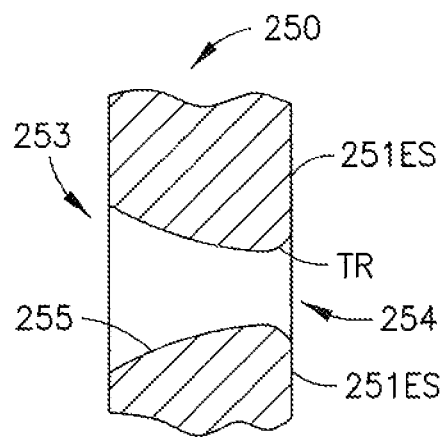
Figure 4C:
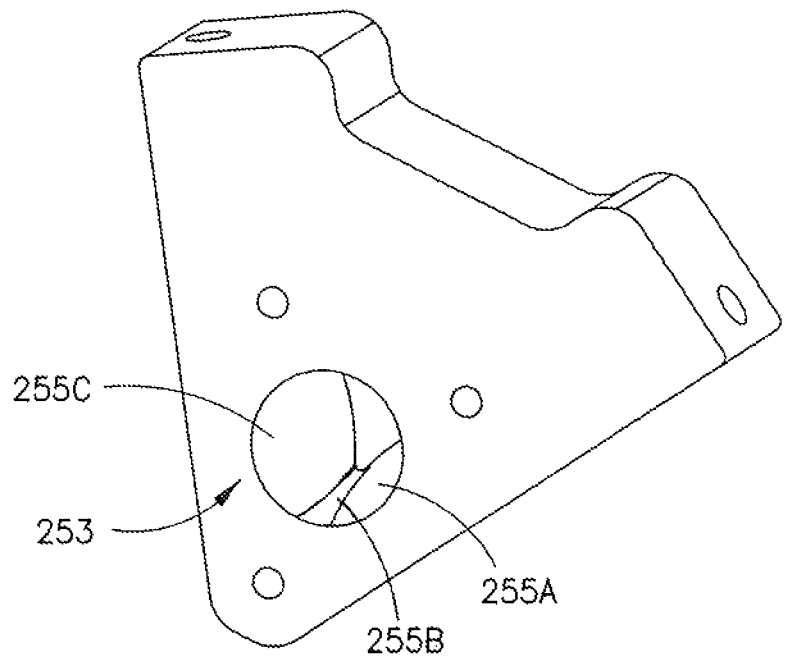
Figure 5A:
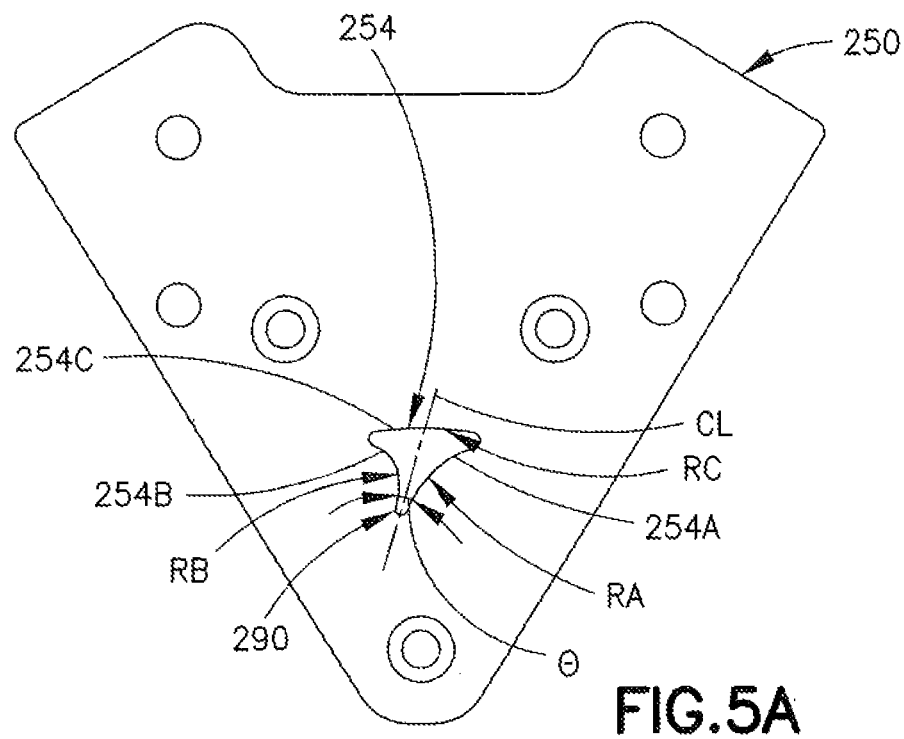
Figure 5B:
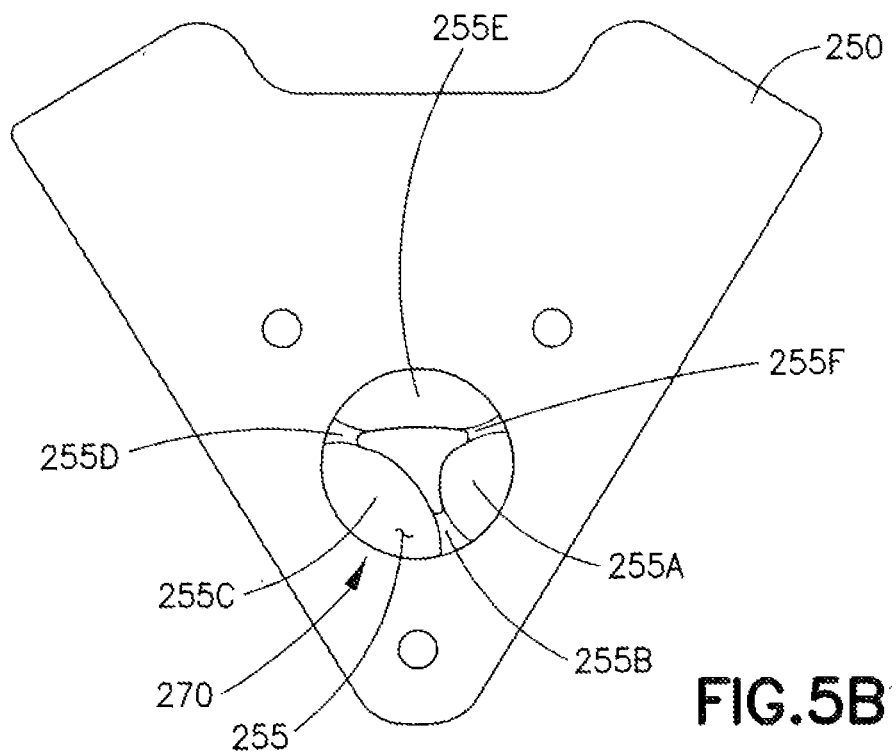
Figure 6A:
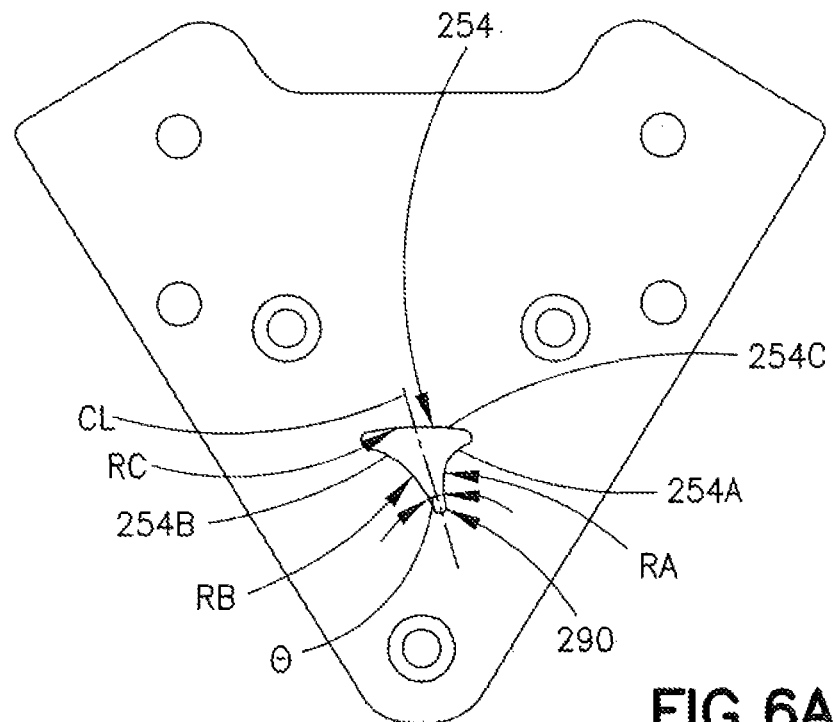
Figure 6B:
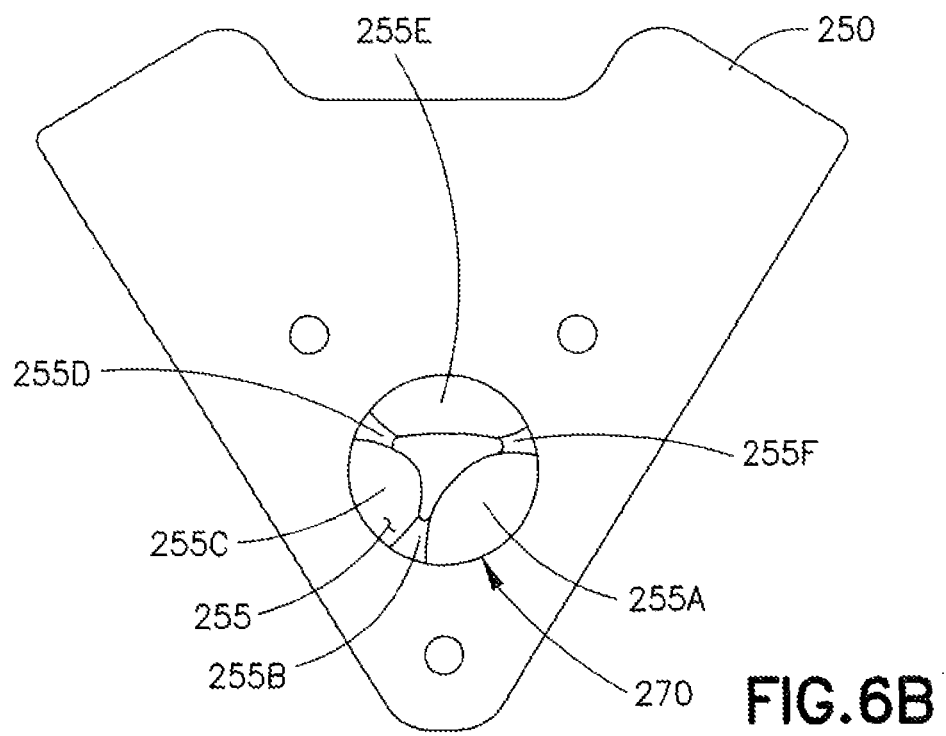
Figure 7:
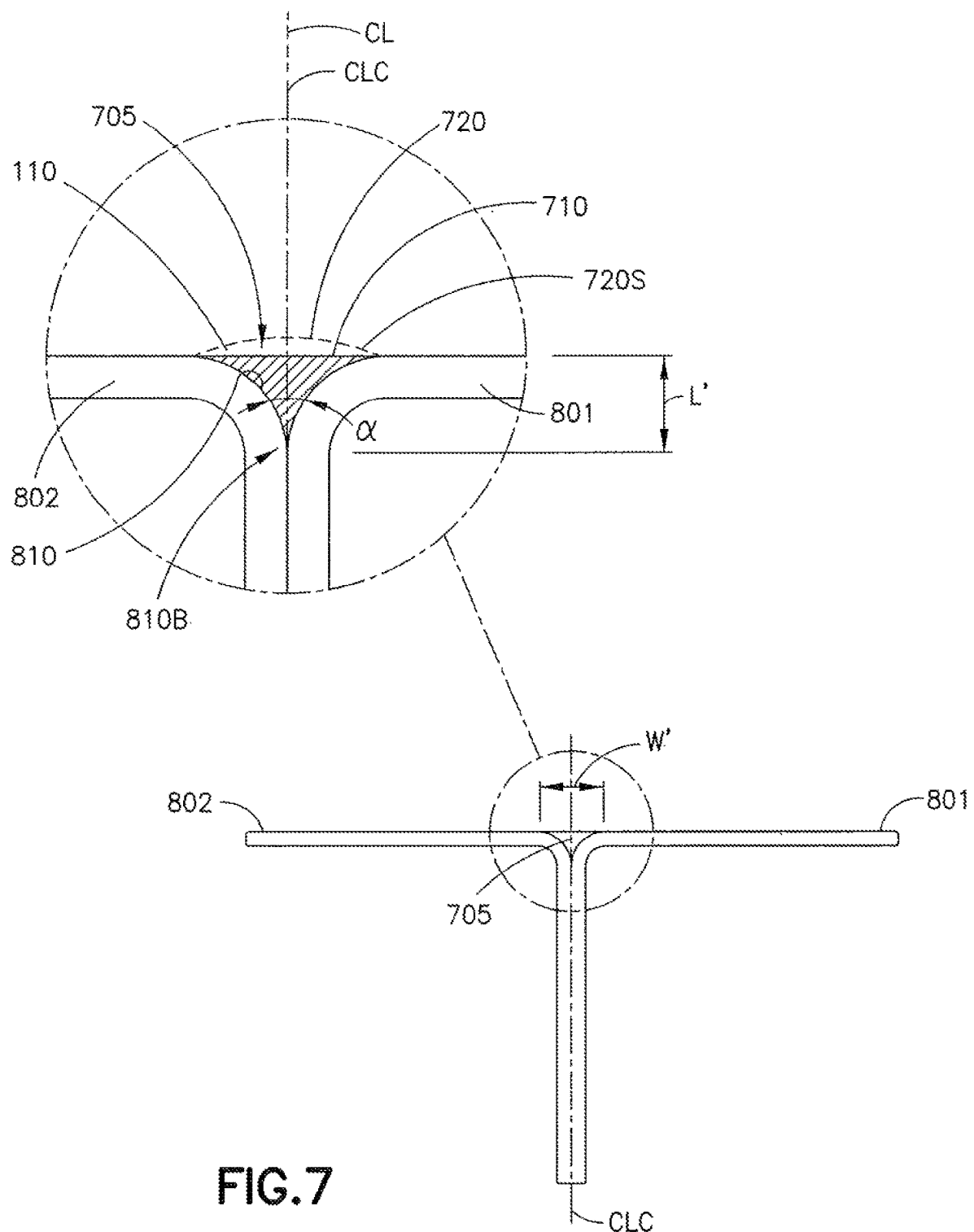
Figure 8:
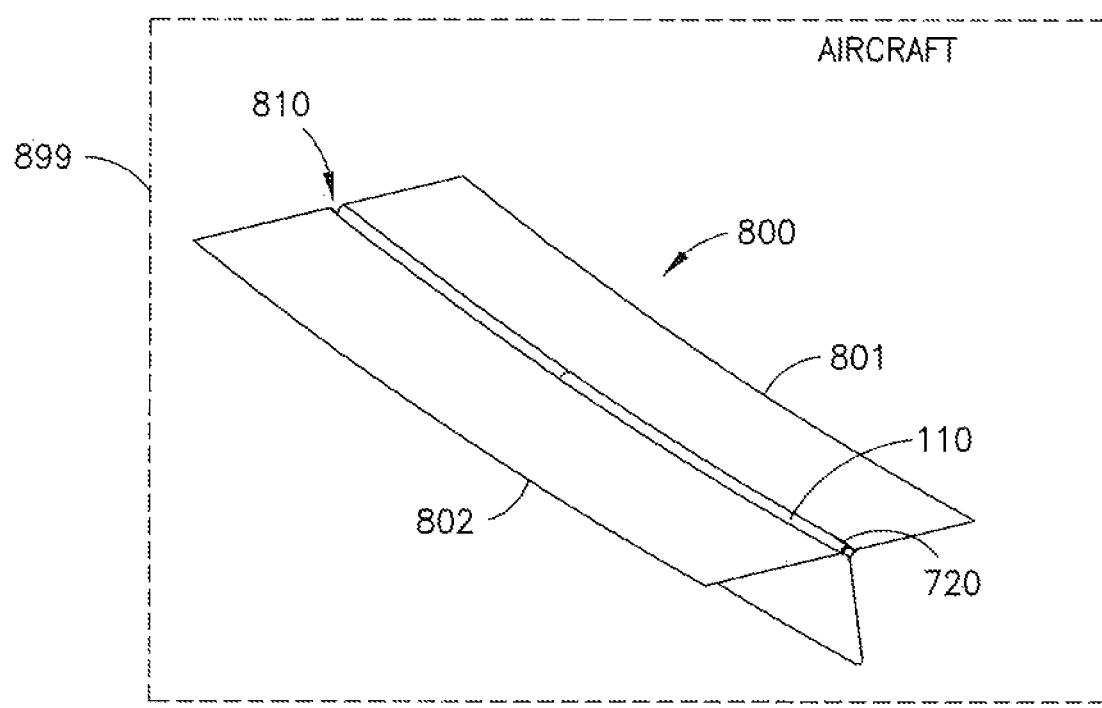
Figure 9:
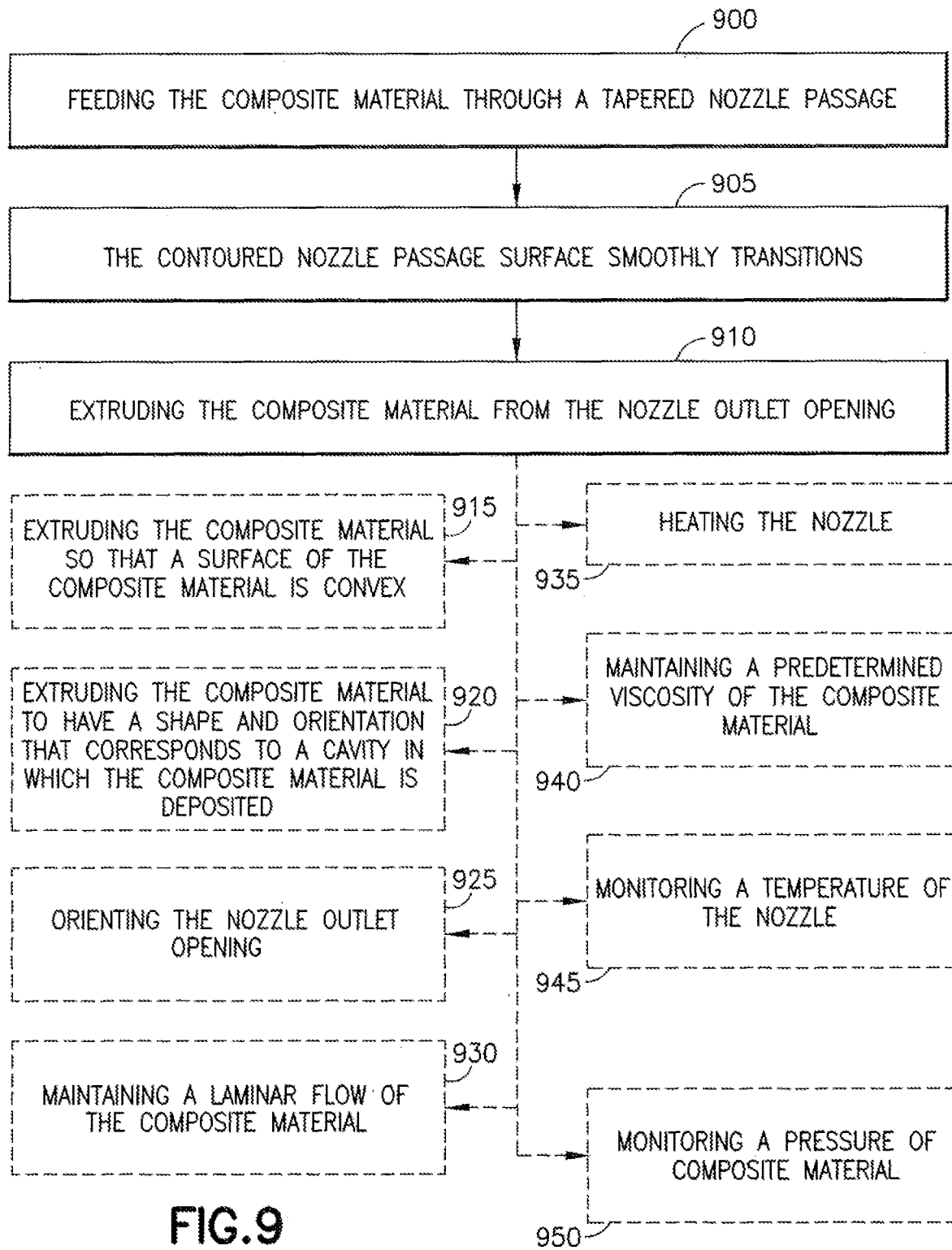
Figure 10:
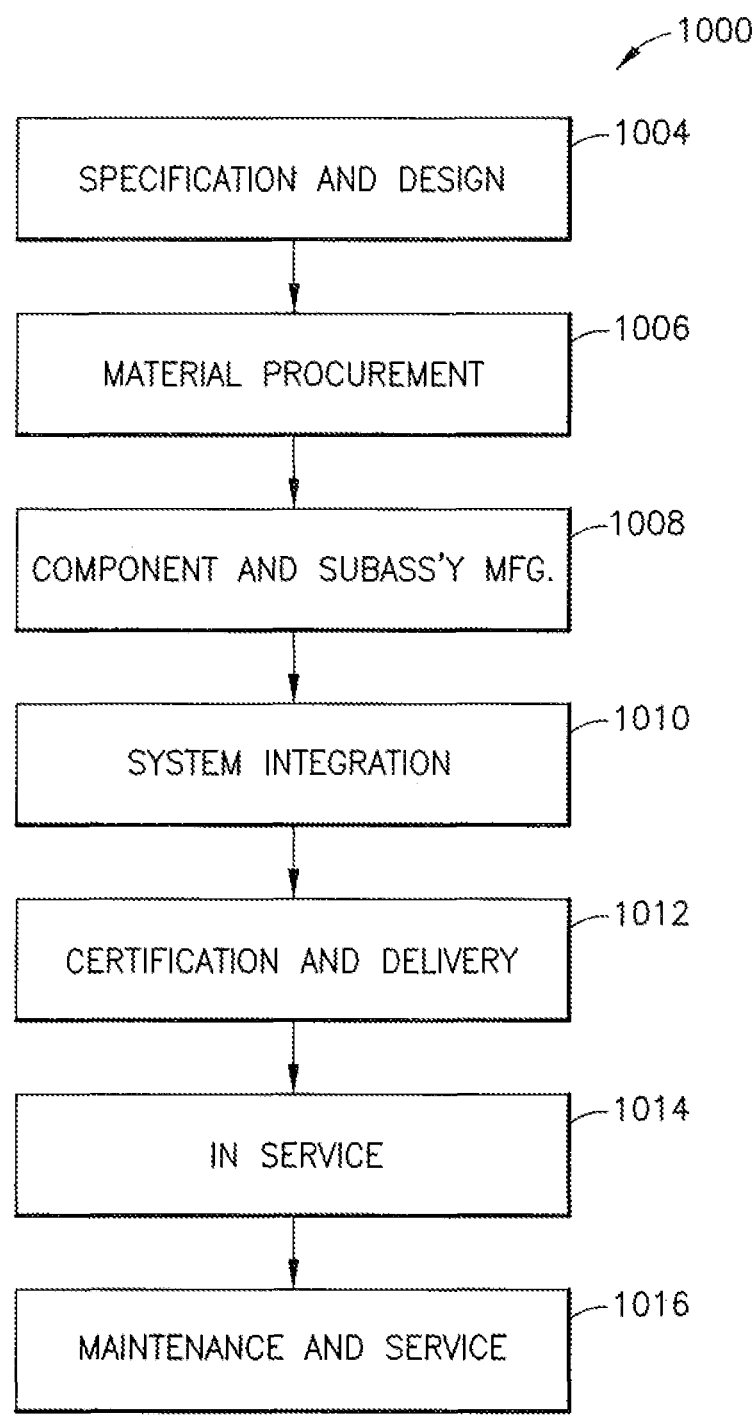

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of an apparatus including a nozzle assembly, according to one or more aspects of the present disclosure;

FIG. 2A is a schematic illustration of a nozzle assembly, according to one or more aspects of the present disclosure;

FIG. 2B is a schematic illustration of the nozzle assembly of FIG. 2A, according to one or more aspects of the present disclosure;

FIG. 2C is a schematic illustration of the nozzle assembly of FIG. 2A, according to one or more aspects of the present disclosure;

FIG. 3A is a schematic illustration of a portion of the nozzle assembly of FIG. 2A, according to one or more aspects of the present disclosure;

FIG. 3B is a schematic illustration of a portion of the nozzle assembly of FIG. 2A, according to one or more aspects of the present disclosure;

FIG. 4A is a schematic illustration of a portion of the nozzle assembly of FIG. 2A, according to one or more aspects of the present disclosure;

FIG. 4B is a schematic illustration of a portion of the nozzle assembly of FIG. 2A, according to one or more aspects of the present disclosure;

FIG. 4C is a schematic illustration of a portion of the nozzle assembly of FIG. 2A, according to one or more aspects of the present disclosure;

FIG. 5A is a schematic illustration of a portion of the nozzle assembly of FIG. 2A, according to one or more aspects of the present disclosure;

FIG. 5B is a schematic illustration of a portion of the nozzle assembly of FIG. 2A, according to one or more aspects of the present disclosure;

FIG. 6A is a schematic illustration of a portion of the nozzle assembly of FIG. 2A, according to one or more aspects of the present disclosure;

FIG. 6B is a schematic illustration of a portion of the nozzle assembly of FIG. 2A, according to one or more aspects of the present disclosure;

FIG. 7 is a schematic illustration of an aircraft stringer including material extruded according to one or more aspects of the present disclosure;

FIG. 8 is a schematic illustration of an aircraft stringer including material extruded according to one or more aspects of the present disclosure;

FIG. 9 is a flow diagram of a method, according to one or more aspects of the present disclosure; and FIG. 10 is a block diagram of aircraft production and service methodology.

DETAILED DESCRIPTION

Illustrative, non-exhaustive examples, which may or may not be claimed, of the subject matter according the present disclosure are provided below.

Referring to FIGS. 1-4C and 7, in one aspect, the nozzles 250 and nozzle assemblies 200 described herein allow a composite material 110, such as a short-fiber-reinforced epoxy based polymer system, to be extruded from the nozzles 250 and nozzle assemblies 200 for the manufacture of composite details, such as cured fillers and cured material noodles 705. During use at least a nozzle tip radius 290R, a tapered nozzle passage 252, and material flow convergence rate are optimized within the cross-sectional configuration of the nozzles 250 and nozzle assemblies 200. For example, surface contour transitions within the tapered nozzle passage 252 are sized and shaped to maintain uniform surface smoothness for the extrusion of the composite material 110. In one aspect, a shape of the nozzle outlet opening 253 shapes or forms the composite material 110 that exits the nozzle 250 to minimize possible edge tear of the extruded material 110 as the composite material exits the nozzle 250. In one aspect, the nozzles 250 and nozzle assemblies 200 are configured to maintain laminar flow and uniform flow patterns through and out of the nozzle 250 and nozzle assemblies 200, where the laminar flow and uniform flow patterns are maintained by contours and transitions within the tapered nozzle passage and/or with heating of one or more portions of the nozzles or nozzle 250 assemblies 200.

Referring to FIG. 1 an exemplary extrusion system 100 is illustrated incorporating aspects of the present disclosure. In one aspect, the extrusion system 100 includes an extruder 120 that includes, for example, a material feed inlet 125, an extruder barrel 120B having a material flow passage 122 communicably coupled to the material feed inlet 125, an anger 127 extending through the material feed inlet 125 and a drive 130 drivingly coupled to the auger 127. The extrusion system 100 includes a nozzle assembly 200 coupled to the extruder barrel 120B at an extruder barrel output 121 where the material flow passage 122 extends through the extruder barrel output 121 so that the material flow passage 122 is in fluid communication with the nozzle assembly 200. In one aspect, a controller 190 is coupled to one or more of the extruder 120 and nozzle assembly 200 for controlling an operation of the extruder 120 and/or nozzle assembly 200 in the manner described herein. In one aspect, a composite material supply 111 is coupled to the material feed inlet 125 and is configured to provide any suitable extrusion material, such as composite material 110, to the material feed inlet 125 for extrusion from the nozzle assembly 200. In one aspect, composite material 110 is a short-fiber-reinforced polymer, while in other aspects the composite material 110 may be any suitable composite material including any suitable length fibers or other reinforcing members/material.

In one aspect, referring to FIGS. 1 and 2A-2C, the nozzle assembly 200 includes a nozzle 250 and an adapter fitting 201. Referring also to FIGS. 4A-4C, the nozzle 250 is configured to extrude the composite material 110 from the extruder barrel 120B. In one aspect, the nozzle 250 comprises a body 251 and a tapered nozzle passage 252 extending through the body 251. The tapered nozzle passage 252 has a nozzle inlet opening 253 configured to indirectly or directly interface with the extruder barrel 120B, and a nozzle outlet opening 254. In one aspect, the tapered nozzle passage 252 has a contoured nozzle passage surface 255 extending between the extruder barrel 120B and the nozzle outlet opening 254 with smooth transitions 270, free of angles, so that each nozzle passage surface portion 255-255F, having a corresponding contour, transitions smoothly to each other nozzle passage surface portion 255A-255F, having a respective different contour, from the nozzle inlet opening 253 to the nozzle outlet opening 254. In one aspect, a length LP of the tapered nozzle passage 252 from the extruder barrel 120B to the nozzle outlet opening 254 is about one to about one-and-a-half times a diameter D of the material flow passage 122 of the extruder barrel 120B. In other aspects, the length LP of the tapered nozzle passage 252 from the extruder barrel 120B to the nozzle outlet opening 254 may be more than about one-and-a-half times a diameter D of the material flow passage 122 or less than about the diameter D of the material flow passage 122. In one aspect, the length LP may be configured to provide a predetermined material flow convergence rate through the nozzle 250 so that a pressure of the composite material 110 flowing through the tapered nozzle passage 252 is maintained at a predetermined pressure and/or so that a laminar flow is maintained through the nozzle 250 (and through the nozzle assembly 200). In other aspects, the length LP of the tapered nozzle passage 252 provides a suitable transition between the nozzle inlet opening 253 (and/or adapter fitting inlet opening 202 described herein) and the nozzle outlet opening 254 that provides a predetermined surface smoothness of the extruded composite material 110.

In one aspect, the tapered nozzle passage 252 converges so as to maintain a positive pressure gradient throughout a cross-section of the tapered nozzle passage 252 in the smooth transitions 270 so as to resist extruded material surface rupture from surface friction and strain, such as between the composite material 110 and the tapered nozzle passage 252, and within the composite material 110 itself (e.g. strains induced within the composite material as a result of a flow of the composite material 110 through the tapered nozzle passage 252). The smooth transitions 270 and the shape of the tapered nozzle passage 252 increases a surface and edge quality of the extruded composite material 110 by preventing tearing and cracking of the material. The smooth transitions 270 and the Shape of the tapered nozzle passage 252 also minimize shape change of the composite material 110 after extrusion such as by, preventing twisting, curling, or other bending of the extruded composite material 110. In a particular aspect, the smooth transitions 270 and the shape of the tapered nozzle passage 252 provide a laminar flow of the composite material 110 flowing over the contoured nozzle passage surface 255. In one aspect, the contoured nozzle passage surface 255 coupling the nozzle inlet opening 253 and the nozzle outlet opening 254 arcuately transitions at transition TR, at the nozzle outlet opening 254, to an exterior surface of the body 251ES. The transition TR may be any suitable radius or other smooth contour that increases a surface and edge quality of the extruded composite material 110 by preventing tearing and cracking of the material and/or minimizes shape change of the composite material 110 after extrusion such as by, preventing twisting, curling, or other bending of the extruded composite material 110.

In one aspect, the nozzle outlet opening 254 is defined by at least a first edge 254A and a second edge 254B that intersect each other, e.g. at intersection 290, at an acute angle θ. The nozzle outlet opening 254 includes a longitudinal centerline CL that in one aspect bisects the acute angle θ, while in other aspects the acute angle θ may have any suitable spatial relationship with the centerline CL. The acute angle θ may be sized with respect to a channel or cavity 810 (FIG. 8) in which the composite material 110 is to be extruded (as will be explained in further detail herein) so that the extruded composite material 110 fills the channel or cavity 810 (FIG. 8) substantially without any voids between the composite material 110 and the surface(s) of the channel or cavity 810 (FIG. 8), e.g. the extruded composite material 110 is fully inserted to a bottom of the channel or cavity 810 (FIG. 8). In one aspect, the nozzle outlet opening 254 is symmetric with respect to, for example, the centerline CL. In other aspects, referring to FIGS. 5A-6B the nozzle outlet opening is asymmetric with respect to the centerline CL as will be described in greater detail herein.

In one aspect, the first edge 254A and the second edge 254B are curved, in a plane P1 of the nozzle outlet opening 254 where the plane P1 is, in one aspect, substantially parallel with exterior surface 251ES of the body 251. The curved first edge 254A and curved second edge 254B may, in one aspect, provide for the insertion of the extruded composite material 110 to a bottom of the channel or cavity 810 (FIG. 8) into which the extruded composite material 110 is deposited. In one aspect, the first edge 254A and the second edge 254B are concave relative to the tapered nozzle passage 252 so that the first edge 254A and the second edge 254B extend towards the centerline CL of the nozzle outlet opening 254. In one aspect, the first edge 254A has a curvature or radius RA and the second edge 254B has a curvature or radius RB. In one aspect, such as where the nozzle outlet opening 254 is symmetric, the curvature RA of the first edge 254A is substantially the same as the curvature RB of the second edge 254B.

Referring also to FIGS. 5A-6B, as described above, the nozzle outlet opening 254 may be asymmetric with respect to the centerline CL. For example, as shown in FIGS. 5A and 5B the curvature RA of the first edge 254A may be greater than the curvature RB of the second edge 254B. In other aspects, as shown in FIGS. 6A and 6B the curvature RA of the first edge 254A may be less than the curvature RB of the second edge 254B, e.g. the curvature RB of the second edge 254B is greater than the curvature RA of the first edge 254A. By changing the curvature RA, RB of the first edge 254A and the second edge 254B the nozzle outlet opening 254 may be skewed at the intersection 290 so that a shape of the nozzle outlet opening 254 corresponds to or matches an asymmetric shape of a channel or cavity 810 (FIG. 8) into which the composite material 110 is extruded. Matching the shape of the extruded composite material 110 to the channel or cavity 810 (FIG. 8) provides for insertion of the extruded material 110, as described above, into the channel or cavity 810 (FIG. 8) so that there are substantially no voids between the extruded composite material 110 and the surfaces of the channel or cavity 810 (FIG. 8). As can be seen in FIGS. 5A-6B, the smooth transitions 270 are provided on the contoured nozzle passage surface 255 so that each nozzle passage surface portion 255A-255F, having a corresponding contour, transitions smoothly, free of angles, to each other nozzle passage surface portion 255A-255F, having a respective different contour, from the nozzle inlet opening 253 to the nozzle outlet opening 254, as described above.

In one aspect, referring to FIGS. 2A, 4A, 5A and 6A, the nozzle outlet opening 254 includes a third edge 254C spanning between and connecting the first edge 254A with the second edge 254B. The third edge 254C is disposed opposite the intersection 290 of the first edge 254A and the second edge 254B. In one aspect, the third edge 254C has a curvature or radius RC so that the third edge 254C is curved, in the plane P1 of the nozzle outlet opening 254. In one aspect, the curvature RC is such that the third edge 254C is convex relative to the tapered nozzle passage 252. In one aspect, the curvature RC provides a crown 720 (FIG. 7) of composite material 110 that provides for compaction of the composite material 110 into the channel or cavity 810 (FIG. 8).

As can be seen in FIGS. 2A-2C the respective intersections between the first edge 254, the second edge 254B and the third edge 254C are arcuate intersections having any suitable radius 290R. As can also be seen in FIGS. 2A-2C each of the radii 290R has a respective nozzle passage surface portion 255B, 255D, 255F associated therewith that extends from the nozzle inlet opening 253 to the nozzle outlet opening 254. Each of the first edge 254A, the second edge 254B and the third edge 254C also have respective nozzle passage surface portions 255A, 255C, 255E associated therewith that extend from the nozzle inlet opening 253 to the nozzle outlet opening 254. As described above, the nozzle passage surface portions 255A-255F define a tapered nozzle passage 252 that smoothly transitions between a shape of the nozzle inlet opening 253 and a shape of the nozzle outlet opening 254, where each nozzle passage surface portion 255A-255F, having a corresponding contour, transitions smoothly to each other nozzle passage surface portion 255A-255F, having a respective different contour, from the nozzle inlet opening 253 to the nozzle outlet opening 254.

Referring again to FIG. 2A and also to FIGS. 7 and 8, in one aspect, the nozzle outlet opening 254 is sized and shaped so that a longitudinal length L of the nozzle outlet opening 254 is greater than a length. L' of a shape 710 of a cured material noodle 705 extruded from the nozzle outlet opening 254. In one aspect, a lateral width W of the nozzle outlet opening 254 is narrower, relative to a centerline of the nozzle outlet opening 254, than a lateral width W' of the shape 710 of the cured material noodle 705 extruded from the nozzle outlet opening 254. In one aspect, the length L and width W of the nozzle outlet opening 254 provides for the extruded composite material 110 to be placed or deposited at a bottom 810B of the channel or cavity 810 with substantially no voids between the surfaces of the cavity 810 and the extruded composite material 110.

Referring again to FIG. 4A, in one aspect, at least one heating element 450 is mounted to the body 251 of the nozzle 250 in any suitable manner. The at least one heating element 450 may heat the body 251 of the nozzle 250 to any suitable predetermined temperature so that, for example, a predetermined viscosity of composite material 110 flowing through the tapered nozzle passage 252 is maintained. In one aspect, the at least one heating element 450 is mounted to the body 251 so as to be substantially parallel with one or more of the first edge 254A, the second edge 254B and the third edge 254C of the nozzle outlet opening 254. In another aspect, the at least one heating element 450 is mounted to the body 251 of the nozzle 250 so as to be parallel with at least a portion of the exterior surface 251ES of the body 251 such as, for example, a side 251SS of the body 251 extending between the nozzle inlet opening 253 and the nozzle outlet opening 254. In one aspect, the body 251 has a suitable mass so as to maintain a temperature of the body with minimal temperature variances induced by changing ambient conditions. In other aspects, the at least one heating element 450 may be mounted to the body so as to have any suitable spatial relationship with the tapered nozzle passage 252 and/or the exterior surface 251ES. In one aspect, the at least one heating element 450 comprises a heating element that is inserted into one or more cavities 260 of the body 251. In other aspects, the at least one heating element 450 comprises a heat tape that is coupled to or wrapped around the exterior surface 251ES of the body 251.

In one aspect, at least one temperature sensor 460 is mounted to the body 251 for monitoring the temperature of the body 251. In one aspect, the at least one temperature sensor 460 may be coupled to the controller 190 where the at least one temperature sensor 460 provides temperature feedback to the controller 190. In one aspect, communication between the controller 190 and the temperature sensor 460 (and other sensors described herein that are provided in the nozzle assembly 200) is a closed loop communication for providing closed loop control of the nozzle assembly 200. In other aspects, an open loop control system may be used. In one aspect, the controller 190 may be coupled to the at least one heating element 450 and use the temperature feedback from the at least one temperature sensor 460 for controlling the at least one heating element to raise or lower the temperature of the body 251 so that the body 251 is maintained at the predetermined temperature.

In one aspect, referring to FIGS. 1, 2A-2C, 3A and 3B, as described above, the nozzle assembly 200 includes the adapter fitting 201. In one aspect, the adapter fitting 201 includes a flange 211 that is configured to couple with a corresponding flange 140 of the extruder barrel 120B for coupling the adapter fitting 201 and the nozzle assembly 200 to the extruder barrel 120B. In one aspect, the adapter fitting 201 may be coupled to the extruder barrel 120B in any suitable manner. For example, in one aspect, at least one quick release coupling 150A, 150B is coupled to the adapter fitting 201 and/or flange 140 of the extruder barrel 120B, where the at least one quick release coupling 150A, 150B is configured to releasably couple the adapter fitting 201 to the extruder barrel 120B. The at least one quick release coupling 150A, 150B provides for time efficient changing of nozzle assemblies 200 such as when changing the nozzles to achieve different extruded material shapes where each of the nozzles has a respectively shaped nozzle outlet opening 254. In other aspects, any suitable fastener such as bolts, clips or any other releasable fastener may be used to couple the adapter fitting 201 to the extruder barrel 120B.

The adapter fitting 201 comprises an adapter fitting inlet opening 202 and an adapter fitting outlet opening 203. The adapter fitting inlet opening 202 is configured to interface with the extruder barrel 120B and the adapter fitting outlet opening 203 is configured to interface with the nozzle inlet opening 253. In one aspect, the adapter fitting 201 includes a contoured adapter passage surface 210 extending between the extruder barrel 120B and the nozzle inlet opening 253. In one aspect, the length LP of the tapered nozzle passage 252 from the extruder barrel 120B to the nozzle outlet opening 254, noted above, is inclusive of a length of the material flow passage through the adapter fitting 201. In one aspect, the contoured adapter passage surface 210 is similar to the contoured nozzle passage surface 255 in that the contoured adapter passage surface 210 provides smooth transition surfaces between the adapter fitting inlet opening 202 and the adapter fitting outlet opening 203. In one aspect, the adapter fitting inlet opening 253 corresponds to a shape of the material flow passage 122 of the extruder barrel 120B so that a smooth transition, free of angles and with substantially laminar composite material flow, between the material flow passage 122 and the contoured adapter passage surface 210 is provided. In one aspect, any suitable alignment pins/surfaces 215 may be provided on or in the adapter fitting 201 flange 211 and/or the flange 140 of the extruder barrel 120B so that the adapter fitting inlet opening 253 is aligned with the material flow passage 122 of the extruder barrel 120B to provide the smooth transition between the material flow passage 122 and the contoured adapter passage surface 210. In one aspect, a shape of the nozzle inlet opening 253 corresponds to a shape of the adapter fitting outlet opening 203 so that a smooth transition, free of angles and with substantially laminar composite material flow, between the contoured adapter passage surface 210 and the contoured nozzle passage surface 255 is provided as described above with respect to the nozzle passage surface 255.

In one aspect, the adapter fitting 201 and nozzle 250 are constructed as a one piece unitary member, i.e. the nozzle and the adapter fitting are formed integrally as one piece, so that the nozzle inlet opening 253 is substantially equal to the diameter D of the material flow passage 122 of the extruder barrel 120B (e.g. the nozzle inlet opening 253 directly interfaces with the extruder barrel 120B). In other aspects, the adapter fitting 201 and the nozzle 250 are releasably coupled to each other in any suitable manner such as with any suitable quick release coupling 160, bolts, clips or any other releasable fastener (e.g. the nozzle inlet opening 253 indirectly interfaces with the extruder barrel 120B through the adapter fitting 201). In one aspect, at least one quick release coupling 160 is coupled to the body 251 of the nozzle 250 and/or to the adapter fitting 201, where the at least one quick release coupling 160 is configured to couple the nozzle 250 to the adapter fitting 201. In one aspect, any suitable alignment pins/surfaces 216A, 216B may be included in the adapter fitting 201 and/or body 251 of the nozzle 250 (and/or on the fasteners themselves such as with shoulder bolts) so that a contoured adapter passage surface 210 of the adapter fitting 201 is aligned with the contoured nozzle passage surface 255 of the nozzle 250. In one aspect, the contoured adapter passage surface 210 of the adapter fitting 201 and the contoured nozzle passage surface 255 of the nozzle 250 are aligned so that the contoured adapter passage surface 210 and the contoured nozzle passage surface 255 define a smooth inner surface extending between the adapter fitting inlet opening 202 and the nozzle outlet opening 254 where the smooth inner surface has smooth transitions that are free of angles as described above with respect to the nozzle passage surface 255.

Referring to FIGS. 1, 2A, 7, 8 and 9, the aspects of the present disclosure may be employed to extrude the composite material 110 into, for example, the cavity 810 of an aircraft 899 stringer where the cavity 810 is formed where at least a first stringer portion 801 and a second stringer portion 802 are joined together. In other aspects, the aspects of the present disclosure may be employed to extrude the composite material 110 into any suitable cavity or channel of any suitable workpiece or structure. In one aspect, the cavity 810 has a length L' and a width W' where a bottom 810B of the cavity 810 is narrower than a top 810T of the cavity 810. In this aspect, the cavity 810 is substantially symmetric about a longitudinal centerline CLC of the cavity 810 but in other aspects, the bottom 810B of the cavity 810 may be skewed with respect to the centerline CLC so that a shape of the cavity 810 corresponds to a shape of the nozzle outlet opening 254 as illustrated in FIGS. 5A-6B.

In one aspect, to extrude the composite material 110 through the nozzle assembly 200, the composite material 110 is fed from the composite material supply 111 into the extruder 120 through the material feed inlet 125. The composite material flows from the material feed inlet 125 into the material flow passage 122 of the extruder barrel 120B. The auger 127, which is rotated within the extruder barrel 120B by drive 130, pushes the composite material through the material flow passage 122 so that the composite material flows through the extruder barrel output 121 into the nozzle assembly 200. The composite material is fed, by the auger 127, through the tapered nozzle passage 252 that extends through the body 251 of the nozzle 250 (inclusive of the adapter fitting 201 where the adapter fitting 201 and the nozzle 250 are releasable coupled to each other) between the extruder barrel 120B and the nozzle outlet opening 253 of the nozzle 250 where the composite material flows over the contoured nozzle passage surface 255 (inclusive of the contoured adapter passage surface 210 where the adapter fitting 201 and the nozzle 250 are releasably coupled to each other) of the tapered nozzle passage 252 (FIG. 9, Block 900). In one aspect, the contoured nozzle passage surface 255 smoothly transitions TR, free of angles, so that each nozzle passage surface portion 255A-255F, having a corresponding contour, transitions smoothly to each other nozzle passage surface portion 255A-255F, having a respective different contour, from the extruder barrel 120B to the nozzle outlet opening 254, and the nozzle outlet opening 254 is defined by at least a first edge 254A and a second edge 254B that intersect each other at an acute angle $\theta$ (FIG. 9, Block 905). In one aspect, the composite material 110 fed through the tapered nozzle passage 252 is extruded from the nozzle outlet opening 254 (FIG. 9, Block 910).

In one aspect, extruding the composite material 110 from the nozzle outlet opening 254 comprises extruding the composite material 110 so that a surface 720S of the composite material 110 opposite the acute angle $\theta$ is convex relative to the acute angle $\theta$ (FIG. 9, Block 915). As described above, this surface 720S, which forms part of the crown 720, provides for the compaction of the extruded composite material 110 within the cavity 810 in any suitable manner, such as with, e.g., a compaction roller. In one aspect, extruding the composite material 110 comprises extruding the composite material 110 to have a shape and orientation that corresponds to the cavity 810 in which the composite material 110 is deposited (FIG. 9, Block 920). Extruding the composite material 110 with a shape and orientation (e.g. in one aspect, the centerline CL of the extruded composite material is substantially aligned with a centerline CLC of the cavity) that corresponds to the cavity provides for the insertion of the extruded composite material 110 into the cavity 810 substantially without voids between the extruded composite material 110 and the surfaces of the cavity 810. In one aspect, extruding the composite material 110 comprises orienting the nozzle outlet opening 253 so that a portion of the composite material 110 formed by the acute angle $\theta$ is deposited into a corresponding portion of the cavity 810 having an angle $\alpha$ corresponding to the acute angle $\theta$ (FIG. 9, Block 925). In one aspect, the angle $\theta$ is smaller than the angle $\alpha$ so that the extruded material can be accommodated by a receiving part, such as e.g. the cavity 810 of stringer 800 (see FIG. 8). Orienting the nozzle outlet opening 253 so that the corresponding angles $\theta$ and $\alpha$ are substantially aligned with each other also provides for the insertion of the extruded composite material 110 into the cavity 810 substantially without voids between the extruded composite material 110 and the surfaces of the cavity 810.

In one aspect, the nozzle 250 can be heated (FIG. 9, Block 935) such as with heating elements 450 to, for example, maintain a predetermined viscosity of the composite material 110 flowing over the contoured nozzle passage surface 255 (FIG. 9, Block 940). In other aspects, the viscosity of the composite material 110 flowing over the contoured nozzle passage surface 255 may be maintained in any suitable manner where the viscosity of the composite material 110 at least in part contributes to the quality of the cured material noodle 705. In one aspect, a temperature of the nozzle 250 may be monitored and the heating elements 450 coupled to the nozzle 250 may be controlled so that a predetermined temperature of the composite material 110 flowing over the contoured nozzle passage surface 255 is maintained (FIG. 9, Block 945). As described above, a temperature sensor 460 may be coupled to the nozzle 250 where the temperature sensor provides temperature feedback to the controller 190 and the controller 190 uses the temperature feedback to control the heating elements 450. In one aspect, a pressure of composite material 110 flowing through the nozzle 250 may also be monitored and a composite material feed device, such as extruder 120, coupled to the nozzle may be controlled so that a predetermined pressure of composite material 110 flow is maintained (FIG. 9, Block 950). In one aspect, the pressure of the composite material 110 through the nozzle 250 may be monitored by monitoring a current or torque of the drive 130 that drives the auger 127 where the current or torque has a predetermined relationship with the pressure of the composite material 110 flowing through the nozzle 250. In other aspects, the pressure of the composite material 110 flowing through the nozzle 250 may be monitored by any suitable pressure sensor 180 (FIG. 1) provided in or on a surface of the nozzle assembly 200 or within the extruder barrel 120B. In one aspect, monitoring the temperature of the nozzle 250 and the pressure of the composite material 110 flowing through the nozzle 250 at least in part contributes to the quality of the cured material noodle 705. In one aspect, a laminar flow of the composite material 110 flowing over a contoured nozzle passage surface 255 is maintained (FIG. 9, Block 930) where the laminar flow, at least in part contributes to the quality of the cured material noodle 705. In one aspect, the laminar flow is provided by the smooth contours of the contoured adapter passage surface 210 and contoured nozzle passage surface 255 and the transition(s) between the contoured adapter passage surface 210, contoured nozzle passage surface 255 and/or the material flow passage 122 of the extruder barrel 120B. In one aspect, the laminar flow may also be provided, in addition to the smooth contours and transitions, by heating the one or more portions of the nozzle 250.

Examples of the present disclosure may be described in the context of aircraft manufacturing and service method 1000 as shown in FIG. 10. In other aspects, the examples of the present disclosure may be applied in any suitable industry, such as e.g. automotive, maritime, aerospace, electronics manufacturing, construction, etc., for extruding composite materials, or other materials into cavities formed by or otherwise between joined structures. With respect to aircraft manufacturing, during pre-production, illustrative method 1000 may include specification and design (block 1004) of aircraft 899 and material procurement (block 1006). During production, component and subassembly manufacturing (block 1008) and system integration (block 1010) of aircraft 899 may take place. Thereafter, aircraft 899 may go through certification and delivery (block 1012) to be placed in service (block 1014). While in service, aircraft 899 may be scheduled for routine maintenance and service (block 1016). Routine maintenance and service may include modification, reconfiguration, refurbishment, etc. of one or more systems of aircraft 899 which may include the deposition of extruded composite material 110 as described herein.

Each of the processes of illustrative method 1000 may be performed or carried out by a system integrator, a third party, an for an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1000. For example, components or subassemblies corresponding to component and subassembly manufacturing (block 1008) may be fabricated or manufactured in a manner similar to components or subassemblies produced while aircraft 899 is in service (block 1014). Also, one or more examples of the apparatus(es), method(s), or combination thereof may be utilized during production stages 1008 and 1010, for example, by substantially expediting assembly of or reducing the cost of aircraft 899. Similarly, one or more examples of the apparatus or method realizations, or a combination thereof, may be utilized, for example and without limitation, while aircraft 899 is in service (block 1014) and/or during maintenance and service (block 1016).

The following are provided in accordance with the aspects of the present disclosure:

A. A nozzle for extruding a composite material from an extruder barrel, the nozzle comprising:
a body; and
a tapered nozzle passage extending through the body, the tapered nozzle passage having
a nozzle inlet opening configured to interface with the extruder barrel, and
a nozzle outlet opening,
where the tapered nozzle passage has a contoured nozzle passage surface extending between the extruder barrel and the nozzle outlet opening with smooth transitions, free of angles, so that each nozzle passage surface portion, having a corresponding contour, transitions smoothly to each other nozzle passage surface portion, having a respective different contour, from the nozzle inlet opening to the nozzle outlet opening, and
the nozzle outlet opening is defined by at least a first edge and a second edge that intersect each other at an acute angle.

A1. The nozzle of paragraph A, wherein the nozzle outlet opening is symmetric.

A2. The nozzle of paragraph A, wherein the nozzle outlet opening is asymmetric.

A3. The nozzle of paragraph A, wherein the first edge and the second edge are curved, in a plane of the nozzle outlet opening, and concave relative to the tapered nozzle passage so that the first edge and the second edge extend towards a centerline of the nozzle outlet opening.

A4. The nozzle of paragraph A3, wherein a curvature of the first edge is greater than a curvature of the second edge.

A5. The nozzle of paragraph A3, wherein a curvature of the first edge is substantially the same as a curvature of the second edge.

A6. The nozzle of paragraph A, wherein the nozzle outlet opening includes a third edge spanning between and connecting the first edge with the second edge, the third edge being disposed opposite an intersection of the first edge and second edge.

A7. The nozzle of paragraph A, wherein the third edge is curved, in a plane of the nozzle outlet opening, and convex relative to the tapered nozzle passage.

A8. The nozzle of paragraph A, wherein the nozzle outlet opening is sized and shaped so that a longitudinal length of the nozzle outlet opening is greater and a lateral width of the nozzle outlet opening is narrower, relative to a centerline of the nozzle outlet opening, than a shape of a cured material noodle extruded from the nozzle outlet opening.

A9. The nozzle of paragraph A, fluffier comprising at least one heating element mounted to the body.

A10. The nozzle of paragraph A, further comprising at least one temperature sensor mounted to the body.

A11. The nozzle of paragraph A, wherein the contoured nozzle passage surface connecting the nozzle inlet opening and the nozzle outlet opening arcuately transitions, at the nozzle outlet opening, to an exterior surface of the body.

A12. The nozzle of paragraph A, wherein a length of the tapered nozzle passage from the extruder barrel to the nozzle outlet opening is about one to about one-and-a-half times a diameter of the nozzle inlet opening.

A13. The nozzle of paragraph A, wherein the tapered nozzle passage converges so as to maintain a positive pressure gradient throughout a cross section of the tapered nozzle passage in the smooth transitions so as to resist extruded material surface rupture from surface friction and strain.

B1. An extrusion system for extruding a composite material, the extrusion system. comprising:
an extruder barrel having an extruder barrel output and a material flow passage extending through the extruder barrel output; and
a nozzle configured to couple to the extruder barrel output, the nozzle including
a body; and
a tapered nozzle passage extending through the body, the tapered nozzle passage having
a nozzle inlet opening configured to receive the composite material from the material flow passage of the extruder barrel, and
a nozzle outlet opening,
where the tapered nozzle passage has a contoured nozzle passage surface extending between the extruder barrel and the nozzle outlet opening with smooth transitions, free of angles, so that each nozzle passage surface portion, having a corresponding contour, transitions smoothly to each other nozzle passage surface portion, having a respective different contour, from the nozzle inlet opening to the nozzle outlet opening, and
the nozzle outlet opening is defined by at least a first edge and a second edge that intersect each other at an acute angle.

B1. The extrusion system of paragraph B, wherein the nozzle outlet opening is symmetric.

B2. The extrusion system of paragraph B, wherein the nozzle outlet opening is asymmetric.

B3. The extrusion system of paragraph B, wherein the first edge and the second edge are curved, in a plane of the nozzle outlet opening, and concave relative to the tapered nozzle passage so that the first edge and the second edge extend towards a centerline of the nozzle outlet opening.

B4. The extrusion system of paragraph B3, wherein a curvature of the first edge is greater than a curvature of the second edge.

B5. The extrusion system of paragraph B3, wherein a curvature of the first edge is substantially the same as a curvature of the second edge.

B6. The extrusion system of paragraph B, wherein the nozzle outlet opening includes a third edge spanning between and connecting the first edge with the second edge, the third edge being disposed opposite an intersection of the first edge and second edge.

B7. The extrusion system of paragraph B, wherein the third edge is curved, in a plane of the nozzle outlet opening, and convex relative to the nozzle passage.

B8. The extrusion system of paragraph B, further comprising an adapter fitting, the adapter fitting comprising an adapter fitting inlet opening and an adapter fitting outlet opening, the adapter fitting inlet opening is configured to interface with the extruder barrel and the adapter fitting outlet opening is configured to interface with the nozzle inlet opening, the adapter fitting including a contoured adapter passage surface extending between the extruder barrel and the nozzle inlet opening.

B9. The extrusion system of paragraph B8, further comprising at least one quick release coupling mounted to the body, the at least one quick release coupling being configured to couple the nozzle to the adapter fitting.

B10. The extrusion system of paragraph B8, wherein the nozzle and the adapter fitting are formed integrally as one piece.

B11. The extrusion system of paragraph B8, wherein the adapter fitting inlet opening corresponds to a shape of a material flow passage of the extruder barrel.

B12. The extrusion system of paragraph B8, wherein a shape of the nozzle inlet opening corresponds to a shape of the adapter fitting outlet opening.

B13. The extrusion system of paragraph B8, further comprising at least one quick release coupling mounted to the adapter fitting, the at least one quick release coupling being configured to couple the adapter fitting to the extruder barrel.

B14. The extrusion system of paragraph B, wherein the nozzle outlet opening is sized and shaped so that a longitudinal length of the nozzle outlet opening is greater and a lateral width of the nozzle outlet opening is narrower, relative to a centerline of the nozzle outlet opening, than a shape of a cured material noodle extruded from the outlet opening.

B15. The extrusion system of paragraph B, further comprising at least one heating element mounted to the body.

B16. The extrusion system of paragraph B, further comprising at least one temperature sensor mounted to the body.

B17. The extrusion system of paragraph B, wherein the contoured nozzle passage surface connecting the nozzle inlet opening and the nozzle outlet opening arcuately transitions, at the nozzle outlet opening, to an exterior surface of the body.

B18. The extrusion system of paragraph B, wherein a length of the tapered nozzle passage from the extruder barrel to the nozzle outlet opening is about one to about one-and-a-half times a diameter of the material flow passage of the extruder barrel.

B19. The extrusion system of paragraph B, wherein the tapered nozzle passage converges so as to maintain a positive pressure gradient throughout a cross section of the tapered nozzle passage in the smooth transitions so as to resist extruded material surface rupture from surface friction and strain.

C. A method of extruding a composite material, the method comprising: feeding the composite material through a tapered nozzle passage that extends through a body of a nozzle between an extruder barrel and a nozzle outlet opening of the nozzle, the composite material flowing over a contoured nozzle passage surface of the tapered nozzle passage where the contoured nozzle passage surface smoothly transitions, free of angles, so that each nozzle passage surface portion, having a corresponding contour, transitions smoothly to each other nozzle passage surface portion, having a respective different contour, from the extruder barrel to the nozzle outlet opening, and the nozzle outlet opening is defined by at least a first edge and a second edge that intersect each other at an acute angle; and extruding the composite material from the nozzle outlet opening.

C1. The method of paragraph C, wherein extruding the composite material comprises extruding the composite material so that a surface of the composite material opposite the acute angle is convex relative to the acute angle.

C2. The method of paragraph C, wherein extruding the composite material comprises extruding the composite material to have a shape and orientation that corresponds to a cavity in which the composite material is deposited.

C5. The method of paragraph C, wherein extruding the composite material comprises orienting the nozzle outlet opening so that a portion of the composite material formed by the acute angle is deposited into a corresponding portion of a cavity having an angle corresponding to the acute angle.

C6. The method of paragraph C, further comprising heating the nozzle.

C7. The method of paragraph C, further comprising maintaining a predetermined viscosity of the composite material flowing over the contoured nozzle passage surface.

C8. The method of paragraph C, further comprising monitoring a temperature of the nozzle and controlling heating elements coupled to the nozzle so that a predetermined temperature of the composite material flowing over a contoured nozzle passage surface is maintained.

C9. The method of paragraph C, further comprising monitoring a pressure of composite material flowing through the nozzle and controlling a composite material feed device coupled to the nozzle so that a predetermined pressure of composite material flow is maintained.

C10. The method of paragraph C, further comprising maintaining a laminar flow of the composite material flowing over a contoured nozzle passage surface.

D. A nozzle assembly for extruding a composite material from an extruder barrel, the nozzle assembly comprising:
a nozzle comprising
a body; and
a tapered nozzle passage extending through the body, the tapered nozzle passage having
a nozzle inlet opening, and
a nozzle outlet opening,
where the tapered nozzle passage has a contoured nozzle passage surface extending between the extruder barrel and the outlet opening with smooth transitions, free of angles, so that each nozzle passage surface portion, having a corresponding contour, transitions smoothly to each other nozzle passage surface portion, having a respective different contour, from the nozzle inlet opening to the nozzle outlet opening, and the nozzle outlet opening is defined by at least a first edge and a second edge that intersect each other at an acute angle; and an adapter fitting comprising an adapter fitting inlet opening and an adapter fitting outlet opening, the adapter fitting inlet opening is configured to interface with the extruder barrel and the adapter fitting outlet opening is configured to interface with the nozzle inlet opening, the adapter fitting including a contoured adapter passage surface extending between the extruder barrel and the nozzle inlet opening.

D1. The nozzle assembly of paragraph D, wherein the contoured adapter passage surface and the contoured nozzle passage surface define a smooth inner surface extending between the adapter fitting inlet opening and the nozzle outlet opening.

D2. The nozzle assembly of paragraph D, wherein the nozzle is configured to be releaseably coupled to the adapter fitting.

D3. The nozzle assembly of paragraph D2, further comprising at least one quick release coupling mounted to the body, the at least one quick release coupling being configured to couple the nozzle to the adapter fitting.

D4. The nozzle assembly of paragraph D, wherein the nozzle and the adapter fitting are formed integrally as one piece.

D5. The nozzle assembly of paragraph D, wherein the adapter fitting inlet opening corresponds to a shape of a material flow passage of the extruder barrel.

D6. The nozzle assembly of paragraph D, wherein a shape of the nozzle inlet opening corresponds to a shape of the adapter fitting outlet opening.

D7. The nozzle assembly of paragraph D, further comprising at least one quick release coupling mounted to the adapter fitting, the at least one quick release coupling being configured to couple the adapter fitting to the extruder barrel.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 9 and 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9 and 10 and the accompanying disclosure describing the operations of the method(s) set forth herein should not be interpreted as necessarily determining a sequence in Which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and methods) disclosed herein include a variety of components features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A nozzle for extruding a composite material from an extruder barrel, the nozzle comprising:
    a body having
        a first end with an extruder barrel mating surface configured to couple with the extruder barrel, and
        a second end; and
    a tapered nozzle passage extending through the body, the tapered nozzle passage having
        a nozzle inlet opening located at the extruder barrel mating surface and having a circular cross-section, the nozzle inlet opening being configured to interface with the extruder barrel, and
        a nozzle outlet opening located at the second end and having a non-circular cross-section,
        where the tapered nozzle passage has a contoured nozzle passage surface extending between the circular cross-section of the nozzle inlet opening at the extruder barrel and non-circular cross-section at the nozzle outlet opening with smooth transitions, free of angular edges, the contoured nozzle passage surface is configured to maintain laminar flow and uniform flow patterns through the tapered nozzle passage from the nozzle inlet to the nozzle outlet where the configuration of the contoured nozzle passage surface is such that each nozzle passage surface portion, having a corresponding contour, transitions smoothly to each other nozzle passage surface portion, having a respective different contour, from the nozzle inlet opening to the nozzle outlet opening, and
        the nozzle outlet opening is defined by at least a first edge and a second edge that are angled relative to each other by an acute angle;
    wherein the contoured nozzle passage surface connecting the nozzle inlet opening and the nozzle outlet opening arcuately transitions, at the nozzle outlet opening, to an exterior surface of the body.

2. The nozzle of claim 1, wherein the first edge and the second edge are curved, in a plane of the nozzle outlet opening, and concave relative to the tapered nozzle passage so that the first edge and the second edge extend towards a centerline of the nozzle outlet opening.

3. The nozzle of claim 1, wherein the nozzle outlet opening includes a third edge spanning between and connecting the first edge with the second edge, the third edge being disposed opposite an intersection of the first edge and second edge.

4. The nozzle of claim 1, wherein the third edge is curved, in a plane of the nozzle outlet opening, and convex relative to the tapered nozzle passage.

5. The nozzle of claim 1, wherein the nozzle outlet opening is sized and shaped so that a longitudinal length of the nozzle outlet opening is greater and a lateral width of the nozzle outlet opening is narrower, relative to a centerline of the nozzle outlet opening, than a shape of a cured material noodle extruded from the nozzle outlet opening.

6. The nozzle of claim 1, wherein a length of the tapered nozzle passage from the extruder barrel to the nozzle outlet opening is about one to about one-and-a-half times a diameter of the nozzle inlet opening.

7. The nozzle of claim 1, further comprising at least one heating element mounted to the body.

8. A nozzle assembly for extruding a composite material from an extruder barrel, the nozzle assembly comprising:
    a nozzle comprising
        a body, and
        a tapered nozzle passage extending through the body, the tapered nozzle passage having
            a nozzle inlet opening, and
            a nozzle outlet opening having a non-circular cross-section,
            where the tapered nozzle passage has a contoured nozzle passage surface extending between the extruder barrel and the outlet opening with smooth transitions, free of angular edges, the contoured nozzle passage surface is configured to maintain laminar flow and uniform flow patterns through the tapered nozzle passage from the nozzle inlet to the nozzle outlet where the configuration of the contoured nozzle passage surface is such that each nozzle passage surface portion, having a corresponding contour, transitions smoothly to each other nozzle passage surface portion, having a respective different contour, from the nozzle inlet opening to the nozzle outlet opening, and
        the nozzle outlet opening is defined by at least a first edge and a second edge that are angled relative to each other by an acute angle; and
    an adapter fitting comprising an adapter fitting inlet opening and an adapter fitting outlet opening, the adapter fitting inlet opening has a circular cross-section and is configured to interface with the extruder barrel and the adapter fitting outlet opening is configured to interface with the nozzle inlet opening, the adapter fitting including a contoured adapter passage surface extending between the extruder barrel and the nozzle inlet opening so that contoured adapter passage surface and the contoured nozzle passage surface in combination form the tapered nozzle passage that is configured to maintain the laminar flow and the uniform flow patterns between the adapter fitting inlet opening and the nozzle outlet opening;

wherein the contoured nozzle passage surface connecting the nozzle inlet opening and the nozzle outlet opening arcuately transitions, at the nozzle outlet opening, to an exterior surface of the body.

9. The nozzle assembly of claim 8, wherein the contoured adapter passage surface and the contoured nozzle passage surface define a smooth inner surface extending between the adapter fitting inlet opening and the nozzle outlet opening.

10. The nozzle assembly of claim 8, wherein the nozzle is configured to be releaseably coupled to the adapter fitting.

11. The nozzle assembly of claim 8, wherein the nozzle and the adapter fitting are formed integrally as one piece.

12. The nozzle assembly of claim 8, wherein the adapter fitting inlet opening corresponds to a shape of a material flow passage of the extruder barrel.

13. The nozzle assembly of claim 8, wherein a shape of the nozzle inlet opening corresponds to a shape of the adapter fitting outlet opening.

14. The nozzle assembly of claim 8, further comprising at least one quick release coupling mounted to the adapter fitting, the at least one quick release coupling being configured to couple the adapter fitting to the extruder barrel.

15. A method of extruding a composite material, the method comprising:
feeding the composite material through a tapered nozzle passage that extends through a body of a nozzle between a circular cross-section of the of a nozzle inlet opening interfaced with an extruder barrel and non-circular cross-section of a nozzle outlet opening of the nozzle, the composite material flowing over a contoured nozzle passage surface of the tapered nozzle passage where
the contoured nozzle passage surface smoothly transitions, free of angular edges, so as to maintain laminar flow and uniform flow patterns through the tapered nozzle passage from a nozzle inlet to the nozzle outlet where each nozzle passage surface portion, having a corresponding contour, transitions smoothly to each other nozzle passage surface portion, having a respective different contour, from the extruder barrel to the nozzle outlet opening, and
the nozzle outlet opening is defined by at least a first edge and a second edge that are angled relative to each other by an acute angle; and
extruding the composite material from the nozzle outlet opening, wherein the contoured nozzle passage surface connecting the nozzle inlet opening and the nozzle outlet opening arcuately transitions, at the nozzle outlet opening, to an exterior surface of the body.

16. The method of claim 15, wherein extruding the composite material comprises extruding the composite material so that a surface of the composite material opposite the acute angle is convex relative to the acute angle.

17. The method of claim 15, wherein extruding the composite material comprises extruding the composite material to have a shape and orientation that corresponds to a cavity in which the composite material is deposited.

18. The method of claim 15, wherein extruding the composite material comprises orienting the nozzle outlet opening so that a portion of the composite material formed by the acute angle is deposited into a corresponding portion of a cavity having an angle corresponding to the acute angle.

19. The method of claim 15, further comprising maintaining a predetermined viscosity of the composite material flowing over the contoured nozzle passage surface.

20. The method of claim 15, further comprising maintaining a laminar flow of the composite material flowing over a contoured nozzle passage surface.

\* \* \* \* \*